(12) United States Patent
Fu et al.

(10) Patent No.: US 8,098,829 B2
(45) Date of Patent: Jan. 17, 2012

(54) METHODS AND SYSTEMS FOR SECURE KEY DELIVERY

(75) Inventors: Christina Fu, Mountain View, CA (US); Steven William Parkinson, Mountain View, CA (US); Nang Kon Kwan, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1220 days.

(21) Appl. No.: 11/447,196

(22) Filed: Jun. 6, 2006

(65) Prior Publication Data

US 2008/0019526 A1 Jan. 24, 2008

(51) Int. Cl.
*H04L 9/08* (2006.01)
(52) U.S. Cl. ......... 380/286; 380/278; 380/281; 380/284
(58) Field of Classification Search .................. 380/281, 380/284, 286
See application file for complete search history.

(56) References Cited

U.S. PATENT DOCUMENTS

| | | |
|---|---|---|
| 4,108,367 A | 8/1978 | Hannan |
| 4,849,614 A | 7/1989 | Watanabe et al. |
| 4,924,330 A | 5/1990 | Seamons et al. |
| 5,247,163 A | 9/1993 | Ohno et al. |
| 5,355,414 A | 10/1994 | Hale et al. |
| 5,499,371 A | 3/1996 | Henninger et al. |
| 5,594,227 A | 1/1997 | Deo |
| 5,631,961 A | 5/1997 | Mills et al. |
| 5,666,415 A | 9/1997 | Kaufman |
| 5,721,781 A | 2/1998 | Deo et al. |
| 5,745,576 A | 4/1998 | Abraham et al. |
| 5,745,678 A | 4/1998 | Herzberg et al. |
| 5,768,373 A | 6/1998 | Lohstroh et al. |
| 5,862,310 A | 1/1999 | Crawford et al. |
| 5,923,884 A | 7/1999 | Peyret et al. |
| 5,937,066 A | 8/1999 | Gennaro et al. |
| 5,943,423 A | 8/1999 | Muftic |
| 5,991,411 A | 11/1999 | Kaufman et al. |
| 5,991,882 A | 11/1999 | O'Connell |
| 6,005,942 A | 12/1999 | Chan et al. |
| 6,005,945 A | 12/1999 | Whitehouse |
| 6,011,847 A | 1/2000 | Follendore, III |
| 6,016,476 A | 1/2000 | Maes et al. |
| 6,044,155 A | 3/2000 | Thomlinson et al. |
| 6,072,876 A | 6/2000 | Obata et al. |

(Continued)

FOREIGN PATENT DOCUMENTS

WO 9724831 7/1997

(Continued)

OTHER PUBLICATIONS

U.S. Appl. No. 11/448,158, filed Jun. 7, 2006, Nang Kon Kwan et al.

(Continued)

*Primary Examiner* — Christian LaForgia
(74) *Attorney, Agent, or Firm* — Lowenstein Sandler PC

(57) ABSTRACT

An embodiment pertains generally to a method of delivering keys in a server. The method includes generating a subject key pair, where the subject key pair includes a subject public key and a subject private key. The method also includes retrieving a storage key and encrypting the subject private key with the storage key as a wrapped storage private key. The method further includes storing the wrapped storage private key.

27 Claims, 4 Drawing Sheets

U.S. PATENT DOCUMENTS

| | | | |
|---|---|---|---|
| 6,141,420 | A | 10/2000 | Vanstone et al. |
| 6,178,507 | B1 | 1/2001 | Vanstone |
| 6,179,205 | B1 | 1/2001 | Sloan |
| 6,226,744 | B1 | 5/2001 | Murphy et al. |
| 6,377,825 | B1 | 4/2002 | Kennedy et al. |
| 6,490,680 | B1 | 12/2002 | Scheidt et al. |
| 6,502,108 | B1 | 12/2002 | Day et al. |
| 6,539,093 | B1 | 3/2003 | Asad et al. |
| 6,636,975 | B1 | 10/2003 | Khidekel et al. |
| 6,643,701 | B1* | 11/2003 | Aziz et al. ............... 709/227 |
| 6,687,190 | B2 | 2/2004 | Momich et al. |
| 6,691,137 | B1 | 2/2004 | Kishi |
| 6,698,654 | B1 | 3/2004 | Zuppicich |
| 6,734,886 | B1 | 5/2004 | Hagan et al. |
| 6,760,752 | B1 | 7/2004 | Liu et al. |
| 6,804,687 | B2 | 10/2004 | Sampson |
| 6,819,766 | B1 | 11/2004 | Weidong |
| 6,826,686 | B1 | 11/2004 | Peyravian |
| 6,829,712 | B1 | 12/2004 | Madoukh |
| 6,880,037 | B2 | 4/2005 | Boyer |
| 6,880,084 | B1 | 4/2005 | Brittenham et al. |
| 6,898,605 | B2 | 5/2005 | Constantino |
| 6,898,714 | B1 | 5/2005 | Nadalin et al. |
| 6,931,133 | B2* | 8/2005 | Andrews et al. ........... 380/286 |
| 6,941,326 | B2 | 9/2005 | Kadyk et al. |
| 6,970,970 | B2 | 11/2005 | Jung et al. |
| 6,978,933 | B2 | 12/2005 | Yap et al. |
| 6,986,040 | B1 | 1/2006 | Kramer et al. |
| 7,007,105 | B1 | 2/2006 | Sullivan et al. |
| 7,010,600 | B1 | 3/2006 | Prasad et al. |
| 7,050,589 | B2 | 5/2006 | Kwan |
| 7,051,213 | B1 | 5/2006 | Kobayashi et al. |
| 7,085,386 | B2 | 8/2006 | Audebert et al. |
| 7,114,028 | B1 | 9/2006 | Green et al. |
| 7,156,302 | B2 | 1/2007 | Yap et al. |
| 7,159,763 | B2 | 1/2007 | Yap et al. |
| 7,185,018 | B2 | 2/2007 | Archbold et al. |
| 7,251,728 | B2 | 7/2007 | Toh et al. |
| 7,278,581 | B2 | 10/2007 | Ong |
| 7,299,364 | B2 | 11/2007 | Noble et al. |
| 7,302,585 | B1 | 11/2007 | Proudler et al. |
| 7,356,688 | B1 | 4/2008 | Wang |
| 7,374,099 | B2 | 5/2008 | de Jong |
| 7,386,705 | B2 | 6/2008 | Low et al. |
| 7,437,757 | B2 | 10/2008 | Holdsworth |
| 7,451,921 | B2 | 11/2008 | Dowling et al. |
| 7,475,250 | B2 | 1/2009 | Aull et al. |
| 7,475,256 | B2 | 1/2009 | Cook |
| 7,480,384 | B2 | 1/2009 | Peyravian et al. |
| 7,502,793 | B2 | 3/2009 | Snible et al. |
| 7,571,321 | B2 | 8/2009 | Appenzeller et al. |
| 7,602,910 | B2 | 10/2009 | Johansson et al. |
| 7,702,917 | B2 | 4/2010 | Tevosyan et al. |
| 7,769,996 | B2 | 8/2010 | Randle et al. |
| 7,822,209 | B2* | 10/2010 | Fu et al. ..................... 380/284 |
| 7,860,243 | B2 | 12/2010 | Zheng et al. |
| 2001/0008012 | A1 | 7/2001 | Kausik |
| 2001/0036276 | A1* | 11/2001 | Ober et al. ................. 380/286 |
| 2001/0054148 | A1 | 12/2001 | Hoornaert et al. |
| 2002/0004816 | A1 | 1/2002 | Vange et al. |
| 2002/0007351 | A1 | 1/2002 | Hillegass et al. |
| 2002/0007359 | A1 | 1/2002 | Nguyen |
| 2002/0010679 | A1 | 1/2002 | Felsher |
| 2002/0029343 | A1 | 3/2002 | Kurita |
| 2002/0056044 | A1 | 5/2002 | Andersson |
| 2002/0059144 | A1 | 5/2002 | Meffert et al. |
| 2002/0064095 | A1 | 5/2002 | Momich et al. |
| 2002/0080958 | A1 | 6/2002 | Ober et al. |
| 2002/0099727 | A1 | 7/2002 | Kadyk et al. |
| 2002/0112156 | A1* | 8/2002 | Gien et al. ................. 713/156 |
| 2002/0120842 | A1 | 8/2002 | Bragstad et al. |
| 2002/0133707 | A1 | 9/2002 | Newcombe |
| 2002/0171546 | A1 | 11/2002 | Evans et al. |
| 2002/0184149 | A1 | 12/2002 | Jones |
| 2002/0188848 | A1 | 12/2002 | Buttiker |
| 2003/0005291 | A1 | 1/2003 | Burn |
| 2003/0012386 | A1* | 1/2003 | Kim et al. .................. 380/286 |
| 2003/0028664 | A1 | 2/2003 | Tan et al. |
| 2003/0035548 | A1* | 2/2003 | Kwan .......................... 380/286 |
| 2003/0056099 | A1* | 3/2003 | Asanoma et al. ........... 713/172 |
| 2003/0075610 | A1 | 4/2003 | Ong |
| 2003/0093695 | A1 | 5/2003 | Dutta |
| 2003/0115455 | A1* | 6/2003 | Aull et al. ................... 713/156 |
| 2003/0115466 | A1* | 6/2003 | Aull et al. ................... 713/172 |
| 2003/0115467 | A1 | 6/2003 | Aull et al. |
| 2003/0115468 | A1* | 6/2003 | Aull et al. ................... 713/175 |
| 2003/0167399 | A1 | 9/2003 | Audebert et al. |
| 2003/0172034 | A1 | 9/2003 | Schneck et al. |
| 2004/0042620 | A1* | 3/2004 | Andrews et al. ........... 380/286 |
| 2004/0053642 | A1 | 3/2004 | Sandberg et al. |
| 2004/0066274 | A1 | 4/2004 | Bailey |
| 2004/0088562 | A1 | 5/2004 | Vassilev et al. |
| 2004/0096055 | A1 | 5/2004 | Williams et al. |
| 2004/0103324 | A1 | 5/2004 | Band |
| 2004/0103325 | A1 | 5/2004 | Priebatsch |
| 2004/0120525 | A1 | 6/2004 | Miskimmin et al. |
| 2004/0144840 | A1 | 7/2004 | Lee et al. |
| 2004/0146163 | A1 | 7/2004 | Asokan et al. |
| 2004/0153451 | A1 | 8/2004 | Phillips et al. |
| 2004/0162786 | A1 | 8/2004 | Cross et al. |
| 2004/0230831 | A1 | 11/2004 | Spelman et al. |
| 2005/0022123 | A1 | 1/2005 | Costantino |
| 2005/0033703 | A1 | 2/2005 | Holdsworth |
| 2005/0109841 | A1 | 5/2005 | Ryan et al. |
| 2005/0114673 | A1 | 5/2005 | Raikar et al. |
| 2005/0119978 | A1 | 6/2005 | Ates |
| 2005/0123142 | A1* | 6/2005 | Freeman et al. ............ 380/277 |
| 2005/0138386 | A1 | 6/2005 | Le Saint |
| 2005/0138390 | A1 | 6/2005 | Adams et al. |
| 2005/0144312 | A1 | 6/2005 | Kadyk et al. |
| 2005/0184163 | A1 | 8/2005 | de Jong |
| 2005/0184164 | A1 | 8/2005 | de Jong |
| 2005/0184165 | A1 | 8/2005 | de Jong |
| 2005/0188360 | A1 | 8/2005 | de Jong |
| 2005/0216732 | A1 | 9/2005 | Kipnis et al. |
| 2005/0262361 | A1 | 11/2005 | Thibadeau |
| 2005/0279827 | A1 | 12/2005 | Mascavage et al. |
| 2005/0289652 | A1 | 12/2005 | Sharma et al. |
| 2006/0005028 | A1 | 1/2006 | Labaton |
| 2006/0010325 | A1 | 1/2006 | Liu et al. |
| 2006/0015933 | A1 | 1/2006 | Ballinger et al. |
| 2006/0036868 | A1 | 2/2006 | Cicchitto |
| 2006/0043164 | A1 | 3/2006 | Dowling et al. |
| 2006/0072747 | A1 | 4/2006 | Wood et al. |
| 2006/0073812 | A1 | 4/2006 | Venkata et al. |
| 2006/0075133 | A1 | 4/2006 | Kakivaya et al. |
| 2006/0075486 | A1 | 4/2006 | Lin et al. |
| 2006/0101111 | A1 | 5/2006 | Bouse et al. |
| 2006/0101506 | A1 | 5/2006 | Gallo et al. |
| 2006/0173848 | A1 | 8/2006 | Peterson et al. |
| 2006/0174104 | A1 | 8/2006 | Crichton et al. |
| 2006/0206932 | A1 | 9/2006 | Chong |
| 2006/0208066 | A1 | 9/2006 | Finn et al. |
| 2006/0226243 | A1 | 10/2006 | Dariel |
| 2006/0291664 | A1 | 12/2006 | Suarez et al. |
| 2006/0294583 | A1 | 12/2006 | Cowburn et al. |
| 2007/0014416 | A1 | 1/2007 | Rivera et al. |
| 2007/0074034 | A1 | 3/2007 | Adams et al. |
| 2007/0112721 | A1 | 5/2007 | Archbold et al. |
| 2007/0113267 | A1 | 5/2007 | Iwanski et al. |
| 2007/0113271 | A1 | 5/2007 | Pleunis |
| 2007/0118891 | A1 | 5/2007 | Buer |
| 2007/0162967 | A1 | 7/2007 | de Jong et al. |
| 2007/0169084 | A1 | 7/2007 | Frank et al. |
| 2007/0189534 | A1 | 8/2007 | Wood et al. |
| 2007/0204333 | A1 | 8/2007 | Lear et al. |
| 2007/0230706 | A1 | 10/2007 | Youn |
| 2007/0271601 | A1 | 11/2007 | Pomerantz |
| 2007/0277032 | A1 | 11/2007 | Relyea |
| 2007/0280483 | A1* | 12/2007 | Fu et al. ..................... 380/286 |
| 2007/0282881 | A1 | 12/2007 | Relyea |
| 2007/0283163 | A1 | 12/2007 | Relyea |
| 2007/0283427 | A1 | 12/2007 | Gupta et al. |
| 2007/0288745 | A1* | 12/2007 | Kwan et al. ................ 713/155 |
| 2007/0288747 | A1* | 12/2007 | Kwan et al. ................ 713/156 |
| 2008/0005339 | A1* | 1/2008 | Kwan et al. ................ 709/229 |
| 2008/0019526 | A1* | 1/2008 | Fu et al. ..................... 380/277 |

| | | | |
|---|---|---|---|
| 2008/0022086 | A1 | 1/2008 | Ho |
| 2008/0022088 | A1* | 1/2008 | Fu et al. ............... 713/156 |
| 2008/0022121 | A1* | 1/2008 | Fu et al. ............... 713/185 |
| 2008/0022122 | A1 | 1/2008 | Parkinson et al. |
| 2008/0022128 | A1 | 1/2008 | Proudler et al. |
| 2008/0034216 | A1 | 2/2008 | Law |
| 2008/0046982 | A1 | 2/2008 | Parkinson |
| 2008/0056496 | A1 | 3/2008 | Parkinson |
| 2008/0059790 | A1 | 3/2008 | Parkinson |
| 2008/0059793 | A1 | 3/2008 | Lord et al. |
| 2008/0069338 | A1 | 3/2008 | Relyea |
| 2008/0069341 | A1 | 3/2008 | Relyea |
| 2008/0072283 | A1 | 3/2008 | Relyea |
| 2008/0077794 | A1 | 3/2008 | Arnold et al. |
| 2008/0077803 | A1 | 3/2008 | Leach et al. |
| 2008/0133514 | A1 | 6/2008 | Relyea |
| 2008/0148047 | A1 | 6/2008 | Appenzeller et al. |
| 2008/0189543 | A1 | 8/2008 | Parkinson |
| 2008/0209224 | A1 | 8/2008 | Lord |
| 2008/0209225 | A1 | 8/2008 | Lord |
| 2008/0229401 | A1 | 9/2008 | Magne |
| 2009/0003608 | A1 | 1/2009 | Lee et al. |
| 2009/0133107 | A1 | 5/2009 | Thoursie |
| 2010/0313027 | A1 | 12/2010 | Taylor |

FOREIGN PATENT DOCUMENTS

| | | | |
|---|---|---|---|
| WO | 0048064 | A1 | 8/2000 |
| WO | 2007096590 | A1 | 8/2007 |

OTHER PUBLICATIONS

U.S. Appl. No. 11/446,956, filed Jun. 6, 2006, Christina Fu et al.
U.S. Appl. No. 11/448,157, filed Jun. 7, 2006, Nang Kon Kwan et al.
U.S. Appl. No. 11/448,179, filed Jun. 7, 2006, Nang Kon Kwan et al.
U.S. Appl. No. 11/462,606, filed Aug. 4, 2006, Nang Kon Kwan et al.
ATM and Credit Gard Notification, Feb. 2005 (internet archive) pp. 1-2 www.thereareplaces.com/infgdes/money.atmnotif.htm.
AMD Announces Specification for Open Platform Management Architecture, Feb. 28, 2005, pp. 1-2 http://www.thefreelibrary.com/AMD+Announces+Specification+for+Open+Platform+Management+Architecture-a0129342307.
Bellvin and Merritt, "Augmented Encrypted Key Exchange: a Password-Based Protocol Secure Against Dictionary Attacks and Password File Compromise", Proceedings of the 1st ACM Conference on Computer and Communications Security, Nov. 1993.
Schneier, "Applied Cryptography: Protocols, Algorithms, and Secure Code in C", 1996, John Wiley & Sons, Inc., Second Edition, pp. 455-456.
Zuccherato, Robert, Elliptic Curve Cryptography Support in Entrust, May 9, 2000.
Red Hat Certificate System, http://www.redhat.com/f/pdf/rhas/DirSecProductSheetCertificateSystem.pdf, Jun. 2005.
PKCS# v2.20: Cryptographic Token Interface Standard, RSA Laboratories, Jun. 28, 2004 (see, e.g. Chapter 10, Objects) (see www.rsasecurity.com, 407 pgs).
Cryptographic Message Syntax, R. Housley, Request for Comments (RFC) 2630, Network Working Group, The Internet Society, Jun. 1999.
Balfanz (Dirk ABalfanz, "Access Control for Ad-Hoc Collaboration", Princeton University Jan. 2001).
Schoeier, Bruce. Applied Cryptography, Second Edttion. 1996 John Wiley and Sons, pp. 480-481.

* cited by examiner

METHODS AND SYSTEMS FOR SECURE KEY DELIVERY

RELATED APPLICATIONS

This application is related to pending U.S. patent application Ser. No. 11/446,957, entitled "Methods and Systems For Server-Side Key Generation" filed concurrently and commonly assigned and U.S. patent application Ser. No. 11/446,956, entitled "Methods And Systems For Key Escrow," filed concurrently and commonly assigned.

FIELD

This invention generally relates to secure client-server systems. More particularly, the invention relates to a method and system for key escrow in a secure client-server system.

DESCRIPTION OF THE RELATED ART

Although smart cards are often compared to hard drives, they are "secured drives with a brain"—they store and process information. Smart cards are storage devices with the core mechanics to facilitate communication with a reader or coupler. They have file system configurations and the ability to be partitioned into public and private spaces that can be made available or locked. They also have segregated areas for protected information, such as certificates, e-purses, and entire operating systems. In addition to traditional data storage states, such as read-only and read/write, some vendors are working with sub-states best described as "add only" and "update only."

The physical characteristics of smart cards are governed by international standards. For example, the size of a card is covered by ISO-7810. ISO-7816 and subsequent standards cover manufacturing parameters, physical and electrical characteristics, location of the contact points, communication protocols, data storage, and more. Data layout and format, however, can vary from vendor to vendor.

Smart cards are a way to increase security especially for enterprise systems. Enterprise system often contain valuable information such as financial data, personnel records, strategies, etc., that may be critical for the entity administrating the enterprise system. Moreover, smart cards may offer a method to control access to data within the enterprise systems. Accordingly, the reasons to use smart card are plentiful.

However, there are drawbacks and disadvantages to smart cards. For example, if a user loses or has the smart card, the user cannot access the information. The user may obtain a replacement smart card for access, but the system administrator may have to perform a substantial number of tasks to allow the user to regain access to his original data.

Smart cards that follow generally accepted best practices do not allow a key to be extracted from the smart card. Thus, archiving of a copy of a key for later restoration, the key has to be generated outside the device.

Therefore, there is a need for a method and system to encrypt a key or key password to allow the key or key password to be securely stored and to allow the encrypted key or key password to be recovered by the principal or his or her organization if the private key or key password is lost or otherwise unavailable to a person authorized to use it.

SUMMARY

An embodiment pertains generally to a method of delivering keys in a server. The method includes generating a subject key pair, where the subject key pair includes a subject public key and a subject private key. The method also includes retrieving a storage key and encrypting the subject private key with the storage key as a wrapped storage private key. The method further includes storing the wrapped storage private key.

Another embodiment relates generally to a system for storing keys. The system includes a token, a security client configured to manage the token, and a security server configured to interface with the security client. The security server is configured to generate a subject key pair, where the subject key pair includes a subject public key and a subject private key. The security server is also configured to retrieve a storage key and encrypt the subject private key with the storage key as a wrapped storage private key. The security server is further configured to store the wrapped storage private key.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

Figure 1:
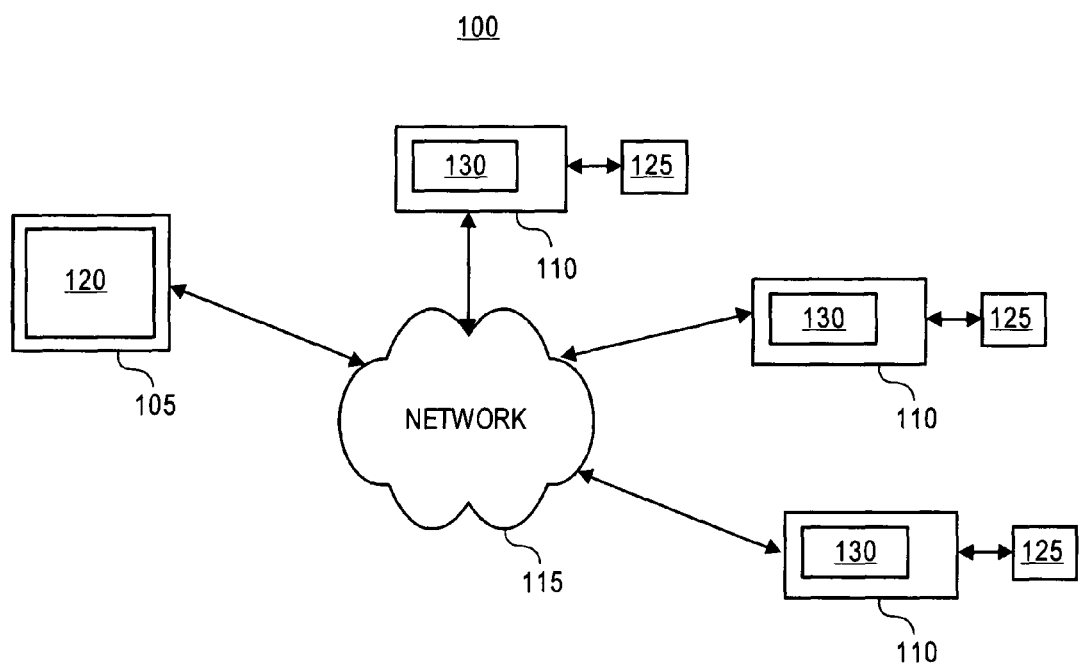
FIG. 1 illustrates an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of secure distributed environments and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to an enterprise security (ES) system executing on a server with a security client executing on a user desktop (erg., Windows, Linux, Mac). The security client may be configured to interface with the ES system and provide an interface to manage a smart card, communicate with ES system, act as a proxy for application program data units (APDUs) sent between the ES system and the smart card, and display user interfaces (UIs) as the ES system directs (for example, prompting user for credentials and/or PIN, displaying smart card status, etc.).

The ES system may include a token management system (TMS, or a security server). The TMS may be configured to act as the registration authority and to direct the entire enrollment process. The TPS may also be configured as the only entity in the ES system to construct the APDUs, which are the message format understood by the smart card. The TMS may interface with a token processing system (TPS) to a token key service (TKS) module, a data recovery manager (DRM) module and a certificate authority (CA) module through a firewall.

In various embodiments, smart cards (more generally tokens) may be configured to store an applet (a small application) and three keys. The three keys may be derived from a master key held by the manufacturer and the card identification number. The derivation of the keys may be implemented by applying a pre-defined function(s) to the master key and the card identification number. One of the keys may be a key encryption key, KEK. The security client may detect the presence of an inserted token in an associated card reader and inform TPS of the token.

The TPS may begin an initialization process that may include the TPS determining whether the applet on the token is outdated and whether the master key has changed since the three keys stored on the token were generated. If any of these conditions are true, the TPS may perform a "key update" in the event of the outdated master key and an "applet upgrade" in the event of outdated applet. As part of the update, the TPS may deliver new keys (derived within the TMS system from the new master key) and/or an updated applet to the token to be stored/injected therein.

The TPS may also determine that the token may need to initialized with server-side generated keys and key archival for those generated keys. More specifically, the TPS may be configured to provide tools that allow a system administrator to set policies to manage users. For example, the system administrator may set a policy where a group of users may have their tokens be enrolled with server-side key generation and key archival of those generated keys.

Accordingly, the security client may transmit a serial number, card unique identification, or card identification (CID) to the TPS of the TMS. The TPS may be configured to forward the CID of the token to the TKS module. The TKS module may be configured to derive a series of keys based on the server master key and the CID. One of the derived keys is the key encryption key, KEK, which is configured to encrypt other secret keys. The TKS module is also configured to generate a key transport session key, KTSK. The TKS module may encrypt the key transport session key, KTSK, with the key encryption key, KEK, i.e., wrap, to arrive at a first encrypted or wrapped key transport session key, KEK (KTSK).

The TKS module may be initially configured to hold a public key of the DRM module, which for the sake of convenience will be referred as a server transport key, STK. The TKS module may include an encrypted secure database where the server transport key, STK, is stored. The TKS module may wrap the key transport session key, KTSK, with the server transport key, STK, to arrive at a second wrapped key transport session key, STK(KTSK). The TKS module may forward the first wrapped key transport session key, KEK(KTSK) and the second wrapped transport session key STK(KTSK) to the TPS.

The TPS may be configured to forward the second wrapped server transport key, STK(KTSK) and the server-side key generation request to the DRM module while temporarily holding the first wrapped key transport session key, KEK (KTSK). The DRM module may be configured to generate an asymmetric key pair, i.e., a subject public and a subject private (SPuK/SPrivK, respectively) key pair, where the subject may represent a user, device, or other entity such as organization, association, etc.

The DRM module may retrieve a storage key, SK, which may be a permanent private storage key owned by the DRM module and generate a storage session key, SSK. The DRM module may encrypt or wrap the subject private key, SPrivK, with the storage session key, SSK, to arrive at a wrapped storage private key, SSK(SPrivK). The DRM module may also encrypt the storage session key, SSK, with the storage key, SK, to arrive at a wrapped storage session key, SK(SSK). The wrapped storage private key, SSK(SPrivK) and the storage session key, SSK, may then be archived or escrowed by the DRM module. The archived keys (SSK(SPrivK) and SK(SSK)) may be used for later recovery in the event of a lost or destroyed token.

The DRM module may then decrypt, i.e., unwrap, the second wrapped transport session key, STK(KTSK), with the complementary key of the server transport key, STK, stored in the DRM module to retrieve the key transport session key, KTSK. The DRM module may then wrap the subject private key, SPrivK, with the key transport session key as a wrapped private key, KTSK(SPrivK) and forward the wrapped private key, KTSK(SPrivK) and the subject public key, SPuK, to the TPS.

The TPS may forward the wrapped private key, KTSK (SPrivK) and the first wrapped key transport session key, KEK(KTSK), to the security client to write into the token. The forwarded wrapped keys (KEK(KTSK) and KTSK (SPrivK)) are received at the token to be injected therein. For the sake of completeness, the token may execute an applet that can retrieve the key encryption key, KEK, which the manufacturer had derived and stored or the TMS has updated and stored Accordingly, the applet may unwrap the first wrapped key transport session key, KEK(KTSK) to retrieve the key transport session key, KTSK. The applet then uses the key transport session key to unwrapped the wrapped private key, KTSK(SPrivK) to retrieve the subject private key, SPrivK.

The TPS may be further configured to send a certificate enrollment request with the information regarding the subject public key, SPuK, to the CA module for certificates for the token. The TPS may subsequently forward received certificates from the CA module to the token. Subsequently, the certificates are written into the token.

FIG. 1 illustrates an exemplary secure system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the secure system 100 includes a server 105, clients 110 and a local network 115. The server 105 may be a computing machine or platform configured to execute a token management system 120 through a multiple user operating system (not shown) in conjunction with the clients 110. The server 105 may be implemented with server platforms as known to those skilled in the art from Intel, Advanced Micro Devices, Hewlett-Packard, etc.

The server 105 may interact with the clients over the local network 115. The local network 115 may be a local area network implementing an established network protocol such as Ethernet, token ring, FDDI, etc. The local network 115 provides a communication channel for the server 105 and clients 110 to exchange data and commands.

The clients 110 may be computing machine or platform (machine) configured to execute secure and open applications through the multi-user operating system. The clients 110 may be implemented with personal computers, workstations, thin clients, thick clients, or other similar computing platform. The clients 110 may use operating systems such as Linux, Windows, Macintosh or other available operating system.

Each client 110 may be configured to interface with a security device 125. The security device 125 may be configured to act as a gatekeeper to the client 110. More particularly, a user may use a security token, such as a smart card, to access the respective client 110. Each client 110 may have a security client 130 executing to monitor the security device 125.

The security client 130 may be configured to manage the token. More specifically, the security client 130 may enroll the token, recovery keys for the token or reset a personal identification number for the token. The security client 130 may also be configured to interface with the token management system 120 and act as a proxy for application program data units (APDUs) between the token management system 120 and the token. The security client 130 may be further configured to display user interfaces as the token processing system 120 directs, i.e., prompting the user for credentials and/or PIN, displaying token status.

In some embodiments, the token management 120 may initiate token enrollment. The security client 130 may detect the presence of the inserted security token and notifies the token management system 120. The token management 120 may prompt the security client 130 to display a user interface querying the user to begin the enrollment process. The security client 130 may forward a card identification (CID) of the token. The CID uniquely identifies the token and is set during the manufacture of the token.

Figure 2:
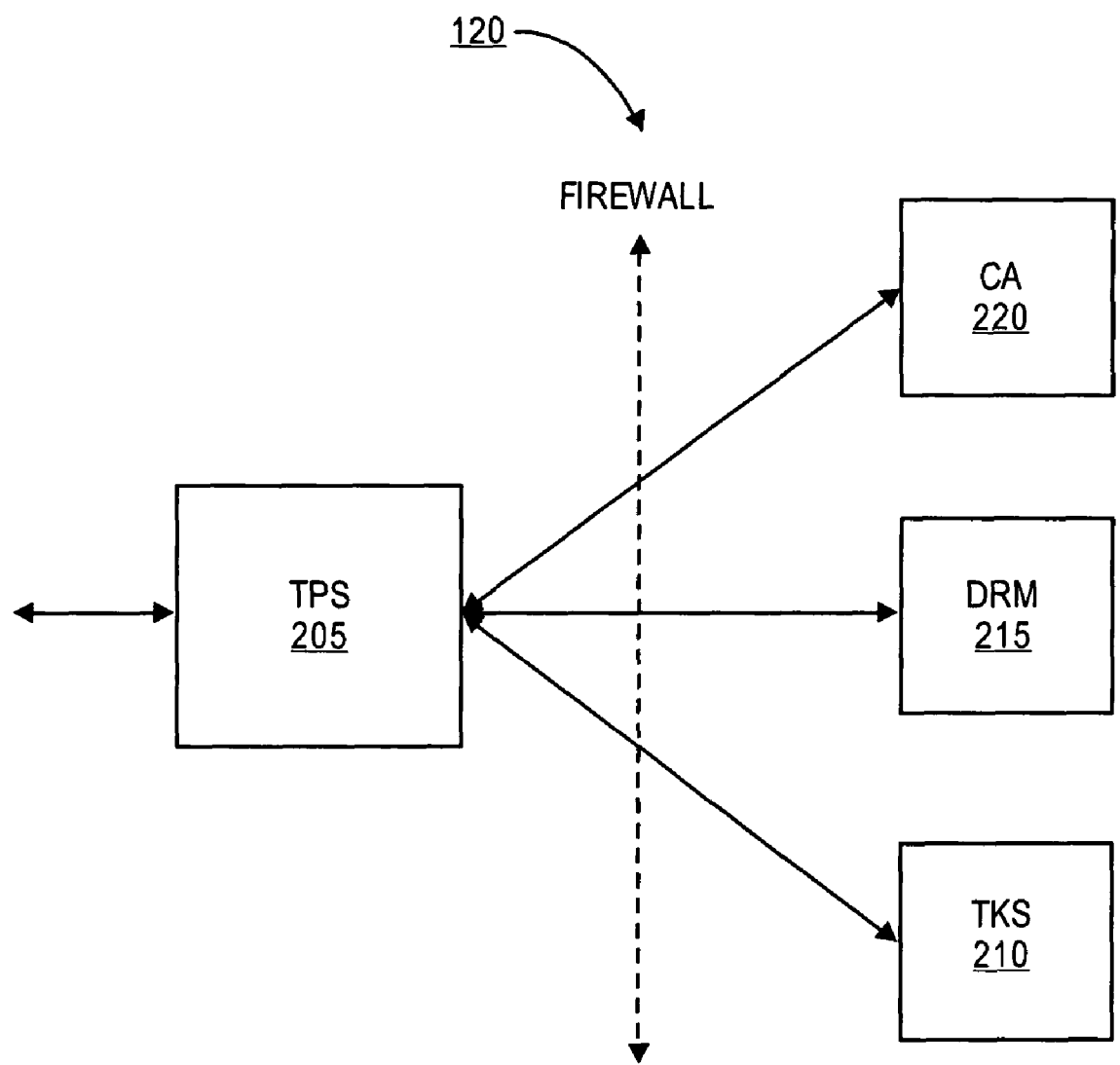
FIG. 2 illustrates an architectural diagram of the security client and server in accordance with another embodiment.

The token management system 120 comprises of several modules, as depicted in FIG. 2. FIG. 2 shows an exemplary architecture of the token management system 120 in accordance with another embodiment. It should be readily apparent to those of ordinary skill in the art that the token management system 120 depicted in FIG. 2 represents a generalized schematic illustration and that other components may be added or existing components may be removed or modified. Moreover, the token management system 120 may be implemented using software components, hardware components, or combinations thereof.

As shown in FIG. 2, the token management system 120 includes a token processing system (labeled as TPS in FIG. 2) 205, a token key service (TKS) module 210, a data recovery manager (DRM) module 215 and a certificate authority (CA) module 220. The TPS 205 may be configured to act as a registration authority. The TPS 205 may direct the enrollment process. The TPS 205 may be configured to act a gateway between security clients 130 and tokens and the modules of the token management system 120.

The TKS module 210 may be configured to maintain master keys for the tokens. The TKS module 210 may also store symmetric keys associated with the token. These keys may be derived from a single master key combined with smart card serial number or identification number, i.e., the CID. The manufacturer of the smart card may store these symmetric keys onto the token. The manufacturer may also forward the single master key to the administrator of the token management system 120, who installs the key into the TKS module 210. For server side key generation requests, the manufacturer installed symmetric keys are replaced with the server generated keys which are derived the server master key. The TKS module 210 may also be configured to hold a public key of the DRM module 215 as a server transport key, STK, in an encrypted secure database.

The DRM module 215 may be configured to maintain a database of encrypted subject's private keys, which can be recovered on demand by an appropriate process. The DRM module 215 may also be configured to generate a subject public key (SPuK) and a subject private key (SPrivK), where the subject may represent a user, device, or other entity such as organization, association, etc. The DRM module 215 may be further configured to retrieve a storage key, SK. The storage key, SK, may be a private permanent storage key owned by the DRM module 215. The DRM module 215 may generate a storage session key, SSK, to encrypt the subject private key, SPrivK, with the storage session key, SSK, to arrive at a wrapped private key, SSK(SPrivK) and encrypt the storage session key, SSK, with the storage key, SK, to arrive at a wrapped storage session key, SK(SSK). These wrapped keys, SSK(SPrivK) and SK(SSK) are archived or escrowed for later recovery.

The CA module 220 may be configured to generate X.509 certificates in response to received subject public key information and certificate enrollment requests.

In various embodiment, the TPS 205 may receive an enrollment request with a server-side generation request and CID from the security client 130. The TPS 205 may forward the CID of the token 130 from the enrollment request to the TKS module 210. The TKS module 210 may be configured to derive a key encryption key, KEK, that is used in encrypting other secret keys intended for the specific token within the token management system 120. More particularly, the TKS module 120 may be configured to apply a pre-defined function is used to derive the key encryption key, KEK, based on the CID from the token 130. The TKS module 210 may also generate a key transport session key, KTSK. The TKS module 210 may encrypt the key transport session key (KTSK) with the key encryption key (KEK) to arrive at a first encrypted or wrapped key transport session key, KEK(KTSK).

The TKS module 210 may retrieve a server transport key, STK, where the server transport key may be a public key issued by the DRM module 215. The TKS module 210 may wrap the key transport session key, KTSK, with a server transport key, STK, to arrive at a second wrapped key transport session key, STK(KTSK). The TKS module 210 may forward the first wrapped key transport session key, KEK (KTSK) and the second wrapped key transport session key STK(KTSK) to the TPS 205.

The TPS 205 may be configured to forward the second wrapped key transport session key, STK(KTSK) and the server-side key generation request to the DRM module 215 while temporarily holding the first wrapped key transport session key, KEK(KTSK). The DRM module 215 may be configured to generate an asymmetric key pair, i.e., a subject public and a private (SPuK/SPrivK) key pair in response to receiving a server-side key generation request, where the subject may represent a user, device or other entity such as an organization, association, etc.

The DRM module 215 may also be configured to retrieve a storage key, SK, which is a permanent private storage key owned by the DRM module 215 and to generate a storage session key, SSK. The DRM module 215 may then wrap the subject private key, SPrivK with the storage session key, SSK, i.e., STK(SPrivK) and wrap the storage session key, SSK, with the storage key, SK, i.e., SK(SSK). The DRM module 215 may then archive or escrow these wrapped keys for later recovery in the event of a lost or destroyed token.

The DRM module 215 may be further configured to decrypt the second wrapped transport key, STK(KTSK), to obtain the key transport session key, KTSK with the complementary key of the of the server transport key used in the TKS module 210. The server transport key and its complementary key may be symmetric or asymmetric as long as they are shared between the DRM module 215 and the TKS module 210. The DRM module 215 may then wrap the subject private key, SPrivK, with the key transport session key, KTSK, as a wrapped private key, KTSK(SPrivK). The DRM module 215 may forward the wrapped private key, KTSK(SPrivK) and the subject public key, SPuK, to the TPS 205.

The TPS 205 may forward the wrapped private key, KTSK (SPrivK) and the first wrapped key transport session key, KEK(KTSK), to the security client 130 to write into the token. The forwarded wrapped keys (KEK(KTSK) and KTSK(SPrivK)) are received at the token to be injected therein. For the sake of completeness, the token may execute an applet that can retrieve the key encryption key. Accordingly, the applet may unwrap the first wrapped key transport session key, KEK(KTSK) to retrieve the key transport session key, KTSK. The applet then uses the key transport session key, KTSK, to unwrap the wrapped private key, KTK (SPrivK) to retrieve the subject private key, SPrivK. SPuK can either be injected or derived from SPrivK.

The TPS 205 may be further configured to send a certificate enrollment request along with information related to the subject public key, SPuK, to the CA module 220 for certificates for the token. The TPS 205 may subsequently forward received certificates from the CA module 220 to the security client 130. Subsequently, the certificates are written into the token.

Figure 3:
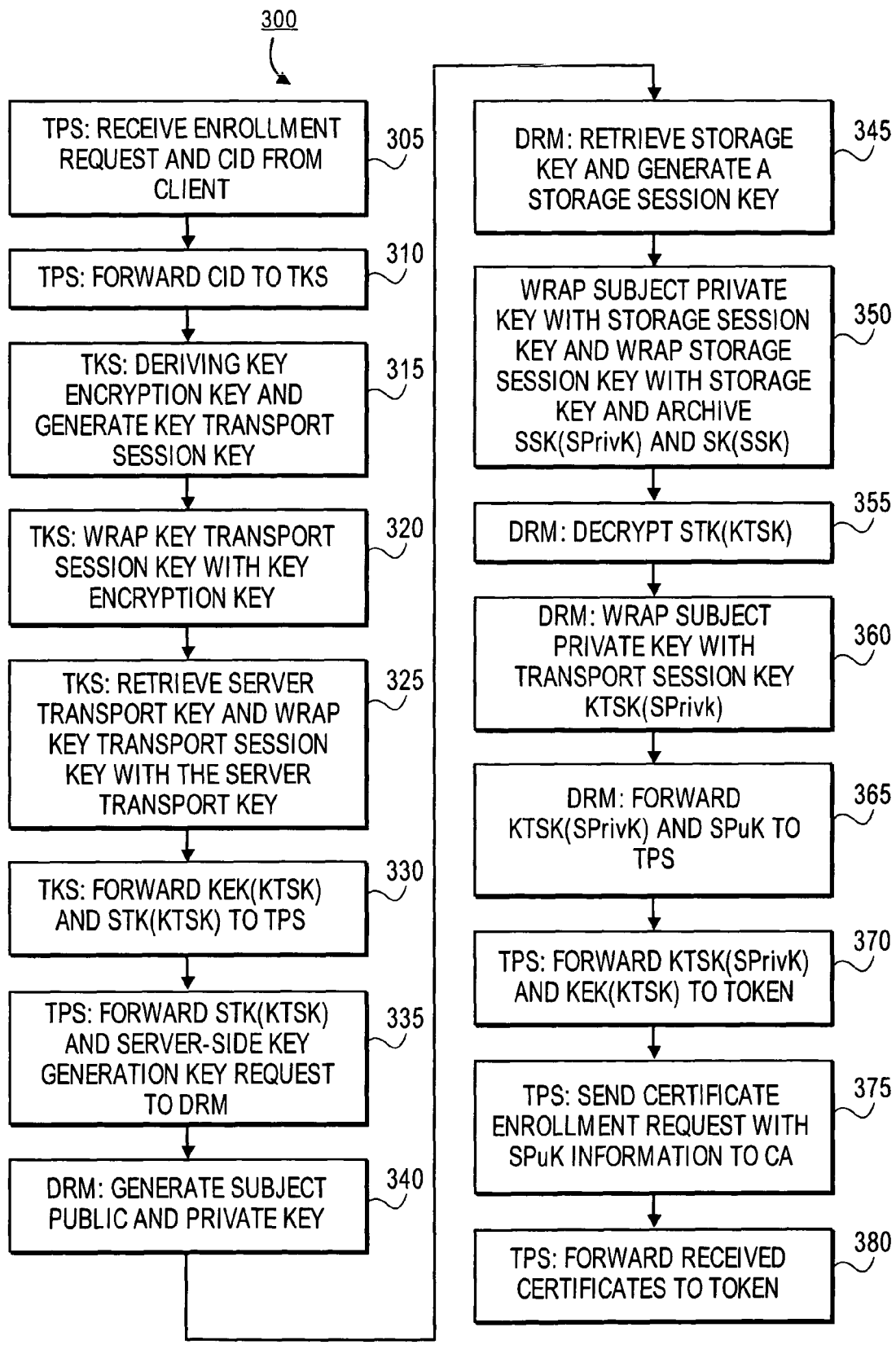
FIG. 3 illustrates an exemplary flow diagram in accordance with yet another embodiment.

FIG. 3 illustrate a flow diagram 300 executed by the token management system 120 in accordance with another embodiment. It should be readily apparent to those of ordinary skill in the art that the flow diagram 300 depicted in FIG. 3 represents a generalized illustration and that other steps may be added or existing steps may be removed or modified.

As shown in FIG. 3, the TPS 205 may receive an enrollment request and the CID from the security client 130 because the user has inserted a new token in the security device 125, in step 305. The TPS 205 may determine that the inserted token requires server-side key generation and key archiving based on configuration policies set up by the system administrator. Alternatively, in other embodiments, the user of the token may request server-side key generation and/or key archiving. Subsequently, the TPS 205 may forward the CID to the TKS module 210, in step 310.

In step 315, the TKS module 210 may be configured to derive a key encryption key, KEK. Within the TKS module 210, the key encryption key, KEK, may be derived by applying a pre-define function to the server master key and the CID. The key encryption key, KEK, may be configured to encrypt other secret keys intended for the inserted token that is associated, i.e., owns, the KEK in the token management system 120. The TKS module 210 may also be configured to generate a key transport session key, KTSK, for use in the duration of an enrollment or a recovery session.

In step 320, the TKS module 210 may encrypt the key transport session key, KTSK, with the key encryption key, KEK, to arrive at a first encrypted or wrapped key transport session key, KEK(KTSK). In step 325, the TKS module 210 may retrieve a server transport key, STK, and wrap the key transport session key (KTSK) with the server transport key, STK, to arrive at a second wrapped key transport session key, STK(KTSK).

In step 330, the TKS module 210 may forward the first wrapped key transport session key, KEK(KTSK) and the second wrapped key transport session key, STK(KTSK) to the TPS 205. In step 335, the TPS 205 may be configured to forward the second wrapped key transport session key, STK (KTSK), and the server-side key generation request to the DRM module 215 while temporarily holding the first wrapped key transport session key, KEK(KTSK).

In step 340, the DRM module 215 may be configured to generate an asymmetric key pair, i.e., a subject public and a private (SPuK/SPrivK, respectively) key pair in response to receiving the server-side key generation request from the TPS 205. In step 345, the DRM module 215 may also be configured to retrieve a storage key, SK, and generate a storage session key, SSK.

In step 350, the DRM module 215 may be further configured to wrap the subject private key, SPrivK, with the storage session key, SSK, to arrive at a wrapped storage private key, SSK(SPrivK). The DRM module 215 may also wrap the storage session key, SSK, with the storage key, SK, to arrive at a wrapped storage session key, SK(SSK). These wrapped keys, SSK(SPrivK) and SK(SSK), may be stored or escrowed in the DRM module 215.

In step 355, the DRM module 215 may decrypt, i.e., unwrap, the second wrapped key transport session key, STK (KTSK) with the complementary key of the server transport key, STK, used in the TKS module 210. In step 360, the DRM module 215 may then wrap the subject private key, SPrivK, with the key transport session key, KTSK as a wrapped private key, KTSK(SPrivK). In step 365, the DRM module 215 may forward the wrapped private key, KTSK(SPrivK) and the subject public key, SPuK to the TPS 205.

In step 370, the TPS 205 may forward the wrapped private key, KTSK(SPrivK) and the first wrapped key transport session key, KEK(KTSK), to the security client 130 to write into the token. The forwarded wrapped keys are received at the token to be injected therein.

In step 375, the TPS 205 may be further configured to send a certificate enrollment request with information related to the subject public key, SPuK, to the CA module 220 for certificates for the token. In step 380, the TPS 205 may subsequently forward received certificates from the CA module 220 to the security client 130. Subsequently, the certificates are written into the token.

Figure 4:
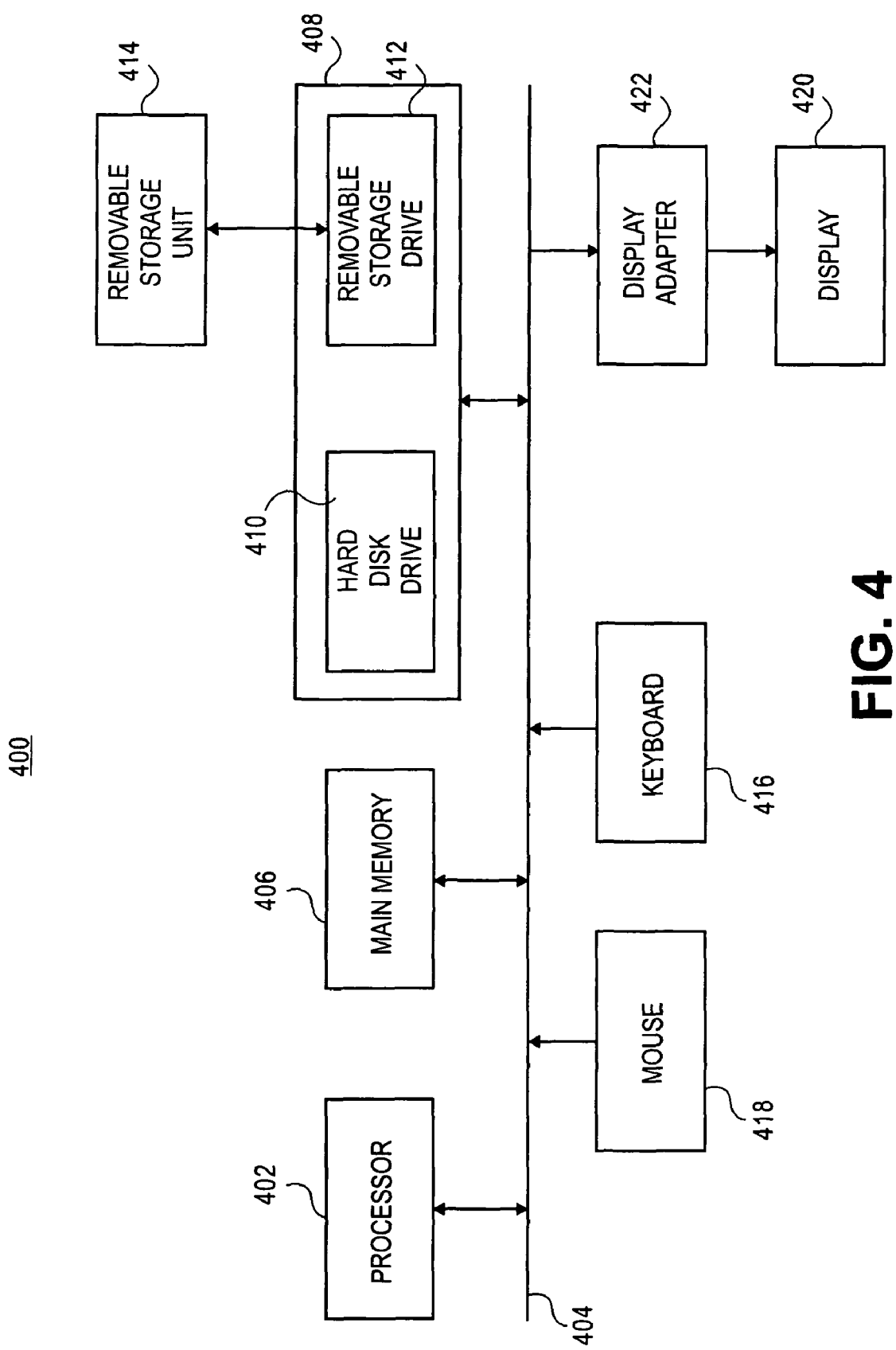
FIG. 4 illustrates an exemplary computing machine.

FIG. 4 illustrates an exemplary block diagram of a computing platform 400 where an embodiment may be practiced. The functions of the security client and token management system may be implemented in program code and executed by the computing platform 400. The security client and token management system may be implemented in computer languages such as PASCAL, C, C++, JAVA, etc.

As shown in FIG. 4, the computer system 400 includes one or more processors, such as processor 402 that provide an execution platform for embodiments of the security client and token management system. Commands and data from the processor 402 are communicated over a communication bus 404. The computer system 400 also includes a main memory 406, such as a Random Access Memory (RAM), where the security client and token management system may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the security client and token management system may be stored. The removable storage drive 412 reads from and/or writes to a removable storage unit 414 in a well-known manner. A user interfaces with the security client and token management system with a keyboard 416, a mouse 418, and a display 420. The display adapter 422 interfaces with the communication bus 404 and the display 420 and receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of generating keys for a token, the method comprising:
   generating, by a processor, a subject key pair wherein the subject key pair includes a subject public key and a subject private key;
   encrypting the subject private key with a storage session key to generate a wrapped storage private key;
   retrieving a storage key associated with a data recovery manager, wherein the storage key is a private key;
   encrypting the storage session key with the storage key to generate a wrapped storage session key; and
   archiving the wrapped storage private key and the wrapped storage session key in the data recovery manager.

2. The method of claim 1, further comprising:
   retrieving the storage key; and
   generating the storage session key.

3. The method of claim 1, further comprising of determining an identification number associated with the token.

4. The method of claim 3, further comprising:
   deriving a key encryption key based on a server master key and the identification number;
   generating a key transport session key; and
   encrypting the key transport session key with the key encryption key to generate a first wrapped key transport session key.

5. The method of claim 4, further comprising:
   retrieving a server transport key; and
   encrypting the key transport session key with the server transport key to generate a second wrapped key transport session key.

6. The method of claim 5, further comprising of forwarding the second wrapped key transport session key to a data recovery manager.

7. The method of claim 6, further comprising:
   decrypting the second wrapped key transport session key with a complementary private key of the server transport key to retrieve the key transport session key; and
   encrypt the subject private key with key transport session key to arrive at a wrapped private key.

8. The method of claim 7, further comprising of forwarding the wrapped private key to the token.

9. The method of claim 1, further comprising of transmitting a certificate enrollment request and information related to the subject public key to certificate authority.

10. The method of claim 1, further comprising of forwarding any generated certificates to the token.

11. An apparatus comprising:
    a memory containing instructions; and
    the processor configured to execute the instructions to perform the method of claim 1.

12. A non-transitory computer-readable medium comprising instructions for causing the processor to perform the method of claim 1.

13. The method of claim 1, wherein the storage key is a permanent key maintained by the data recovery manager.

14. A system for generating keys, the system comprising:
    a security client configured to manage a token; and
    a security server comprising a processor and configured to interface with the security client, wherein the security server is configured to generate a subject key pair, wherein the subject key pair includes a subject public key and a subject private key, encrypt the subject private key with a storage session key to generate a wrapped storage private key, retrieve a storage key associated with a data recovery manager module, wherein the storage key is a private key, encrypt the storage session key with the storage key to generate a wrapped storage session key, and archive the wrapped storage private key and the wrapped storage session key.

15. The system of claim 14, wherein the security server is further configured to execute:
    a token processing gateway configured to manage the interface between the security client and the security server;
    a key service module configured to interface with the token processing gateway;
    a certificate authority module configured to interface with the token processing gateway and to generate certificates; and
    the data recovery manager module configured to interface with the token processing gateway and configured to maintain a database of private keys, wherein the data recovery manager module is configured to store the wrapped storage private key and the wrapped storage session key.

16. The system of claim 15, wherein the key service module is further configured to generate a key transport session key and derive a key encryption key based on a master server key and an identification number associated with the token.

17. The system of claim 16, wherein the key service module is configured to encrypt the key transport session key with the key encryption key to generate a first wrapped key transport session key.

18. The system of claim 17, wherein the key service module is further configured to retrieve a server transport key and encrypt the key transport session key with the server transport key to generate a second wrapped key transport session key.

19. The system of claim 18, wherein the key service module is further configured to forward the first and second wrapped key transport session keys to the token processing gateway.

20. The system of claim 19, wherein the token processing gateway is further configured to forward the second wrapped key transport session key to the data recovery manager module.

21. The system of claim 20, wherein the data recovery manager module is further configured to generate the subject key pair.

22. The system of claim 21, wherein the data recovery manager module is configured to store the wrapped storage private key and the wrapped storage session key in a database maintained by the data recovery manager module.

23. The system of claim 21, wherein the data recovery manager module is further configured to decrypt the second wrapped key transport session key with a complementary private key of the server transport key to retrieve the key transport session key and encrypt the subject private key with the key transport session key to generate a wrapped subject private key.

24. The system of claim 23, wherein the data recovery manager module is further configured to forward the wrapped subject private key to the token processing gateway.

25. The system of claim 15, wherein the token processing gateway is further configured to transmit a certificate enrollment request and information related to the subject public key to the certificate authority module.

26. The system of claim 25, wherein the token processing gateway is further configured to forward any generated certificates to the token at the security client.

27. The system of claim 14, wherein the storage key is a permanent key maintained by the data recovery manager module.

* * * * *